Patented Oct. 22, 1940

2,218,969

UNITED STATES PATENT OFFICE 2,218,969

BLUE PRINT COATING

Robert Bowling Barnes, Stamford, Conn., assignor to American Cyanamid Company, New York, N. Y., a corporation of Maine No Drawing. Application April 2, 1940, Serial No. 327,463

2 Claims. (Cl. 95—7)

This invention relates to blue print coating compositions.

Blue print paper presents a number of problems. In the first place, the paper must show a good speed and give satisfactory depths of blue with a reasonable exposure. It must also show a white background when developed and it should retain this characteristic for a considerable period of time when stored in the dark. In a sense, the two requirements are antagonistic as greater speed is often associated with bluer backgrounds and paper with good keeping qualities may show diminished speed.

The present invention is directed to a blue print coating in which high printing speeds are associated with extraordinary stability and is based on the substitution of ferric guanidine oxalate for the usual ferric ammonium citrate, ferric potassium oxalate or ferric ammonium oxalate in standard blue print formulae.

The reactions which take place when blue print paper is stored, particularly in damp climates, are probably complex but apparently result in autoreduction of certain amounts of ferric salt. The present invention is not based on any theory of the reactions which take place or of the reasons why the higher stability of the coatings of the present invention is possible. Not all of the reactions in this complex phenomenon are fully known and it is not desired to limit the present invention to any theory of action.

The present invention utilizes the ferric ions in the ferric guanidine oxalate to the same degree as is the case with the ferric ammonium oxalate, or other like light-sensitive salts of the same class, that is to say, the ferric guanidine oxalate replaces the ferric ammonium oxalate in stoichoimetrically equivalent amounts which means that 1.53 times as much ferric guanidine oxalate as is required with ferric ammonmimum oxalate, is employed. Otherwise, the blue print formulae do not require any other change and it is an advantage that the blue print coater is not forced to use new technique nor is there anything complicated in the prints of coatings made by the present invention.

Ferric guanidine oxalate is not claimed as a new chemical compound in this case but forms a portion of the subject matter of my copending application Serial No. 294,219, filed September 9, 1939.

The ferric guanidine oxalate of the present invention may be used in conjunction with any of the ferricyanides normally employed in blue printing. Thus, for example, standard potassium ferricyanide or sodium ferricyanide may be employed and the neutral dipotassium ferricyanide and the like may be used in place of the potassium ferricyanide. The action of the ferric guanidine oxalate in increasing stability is noted in every case but the printing speed will in general vary to some extent with the different ferricyanides. While the correlation is not complete, in general with ferricyanides which give increased speed with ferric ammonium oxalate will also give increased speed with ferric guanidine oxalate, and there is often noted some increase in speed with the same ferricyanide when ferric guanidine oxalate is used in place of the ammonium compound.

The present invention will be described in greater detail in conjunction with the specific example which sets forth one of the simplest blue print formulae. The parts are by weight except in the case of water where the corresponding part by volume is used.

Example 1

A solution is prepared as follows:

| | Parts |
|---|---|
| Water | 100.00 |
| Potassium ferricyanide | 5.00 |
| Ferric guanidine oxalate | 20.00 |

Ferric guanidine oxalate is first disoslved in water at 40° C. and the potassium ferricyanide added to the solution, care being taken that the reaction takes place in the absence of actinic light.

The solution has a pH of approximately 5.5 at 25° C. and coating at room temperature is satisfactory. The color of the coating is light apple green when viewed under daylight conditions.

The same grade of paper was coated with a solution made up as above except that a stoichoimetrical equivalent amount of ferric ammonium oxalate. The two coated papers were then printed, both showing good quality of blues, and samples of both papers were then stored under ordinary conditions encountered in normal summer weather. Prints were made of portions of the stored paper from time time to determine the appearance of blue backgrounds.

After seven days the paper made up with the ferric ammonium oxalate showed a distinctly bluish background while the paper having ferric guanidine oxalate still showed a white background after 50 days' storage. Similar results were obtained on accelerated aging tests where the papers were stored at high temperatures, and under conditions of high humidity the same result was observed, that is, the papers coated with the ferric guanidine oxalate formula retained white backgrounds long after the other papers began to show strongly blue color in their backgrounds.

It should be noted that the above tests were made with a simple blue print formula to which no auto-reduction inhibitors had been added. Some commercial papers, particularly premium grades contain auto-reduction inhibitors many of which are trade secrets. With no inhibitor at all, papers coated with the ferric guanidine oxalate formula show a stability equal to the best stability obtained with premium papers having inhibitors. The tests of the example above were, however, made without inhibitors to show the effect of ferric guanidine oxalate without masking by the presence of other variables in the test.

I claim:

1. A blue print coating comprising a ferricyanide and ferric guanidine oxalate.

2. A blue print paper coated with a light-sensitive coating comprising a soluble ferricyanide and ferric guanidine oxalate.

ROBERT BOWLING BARNES.